United States Patent [19]

Schierling et al.

[11] Patent Number: 4,876,999
[45] Date of Patent: Oct. 31, 1989

[54] TWO-STROKE ENGINE

[75] Inventors: Roland Schierling, Affalterbach; Werner Geyer, Waiblingen, both of Fed. Rep. of Germany

[73] Assignee: Andreas Stihl, Waiblingen, Fed. Rep. of Germany

[21] Appl. No.: 261,779

[22] Filed: Oct. 24, 1988

[30] Foreign Application Priority Data

Oct. 22, 1987 [DE] Fed. Rep. of Germany ....... 3735710

[51] Int. Cl.$^4$ ............................................. F02B 75/02
[52] U.S. Cl. .................................. 123/252; 123/73 C
[58] Field of Search ............... 123/73 B, 73 PP, 73 C, 123/73 R, 590, 252

[56] References Cited

U.S. PATENT DOCUMENTS

| | | | |
|---|---|---|---|
| 3,190,271 | 6/1965 | Gudmundsen | 123/73 B |
| 3,730,149 | 5/1973 | Brown | 123/73 R |
| 3,756,206 | 9/1973 | Gommel | 123/73 R |
| 3,807,369 | 4/1974 | Yagi et al. | 123/252 |
| 4,068,629 | 1/1978 | Hooper | 123/73 B |
| 4,248,185 | 2/1981 | Jaulmes | 123/73 R |
| 4,700,668 | 10/1987 | Schierling et al. | 123/73 C |
| 4,768,474 | 9/1988 | Fujimoto et al. | 123/73 B |

FOREIGN PATENT DOCUMENTS 0018507 2/1977 Japan .................... 123/73 B

Primary Examiner—David A. Okonsky
Attorney, Agent, or Firm—Walter Ottesen

[57] ABSTRACT

The invention relates to a two-stroke engine having an overflow channel through which an air/fuel mixture is supplied. The overflow channel is provided with a vaporization chamber having a hot wall against which fuel is injected and vaporized. The vaporized fuel is stored in the vaporization chamber and is carried into the combustion chamber of the engine by fresh air flowing in from the crankcase when the overflow channel is opened. Even at high rotational speed, a good mixture preparation is asssured.

6 Claims, 2 Drawing Sheets

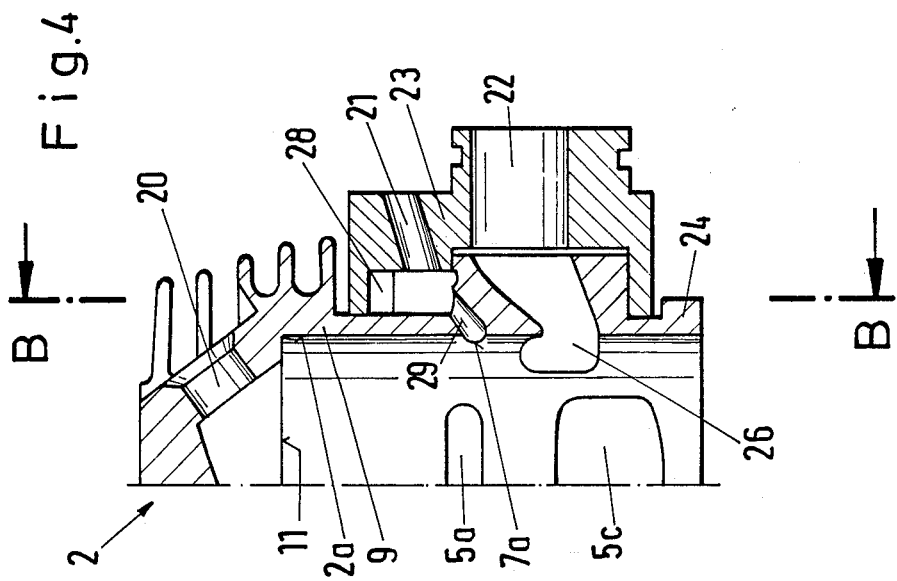
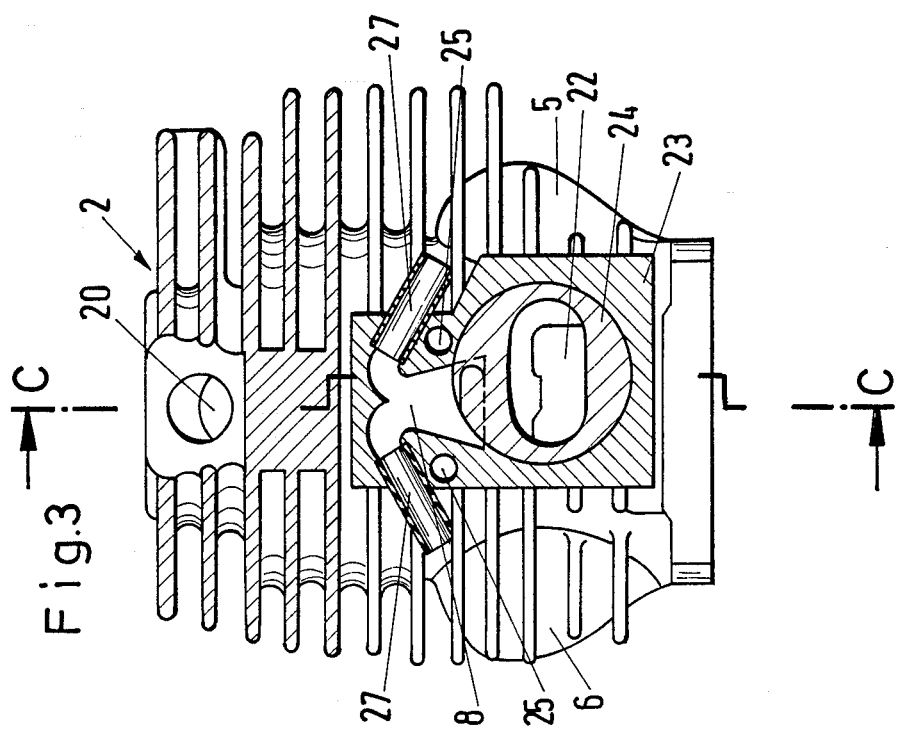

TWO-STROKE ENGINE

FIELD OF THE INVENTION

The invention relates to a two-stroke engine, especially for portable handheld tools such as chain saws or the like.

BACKGROUND OF THE INVENTION

A two-stroke engine of the above kind is disclosed in U.S. Pat. No. 4,248,185. A carburetor is arranged in the intake portion of the mixture overflow channel which enriches through-flowing fresh air with fuel to form an air/fuel-mixture. The mixture is admitted into the cylinder combustion chamber after a component quantity of fresh or scavenging air has been admitted.

The preparation of the mixture by means of a carburetor is not always satisfactory especially with respect to the quality of the exhaust gas. It has therefore already been suggested to inject fuel as an adapted quantity by means of a pneumatically operated injection pump as disclosed in U.S. Pat. No. 4,700,668. However, problems develop with respect to the preparation of the mixture when fuel is injected especially for fast-running two-stroke engines. Only precision machined and therefore expensive injection nozzles distribute the fuel within the short injection time to an extent fine enough that a good mixture formation is assured by the vaporization of the fuel. A high injection pressure is also needed to permit the fuel to exit from the injection nozzle finely distributed as a fuel mist.

SUMMARY OF THE INVENTION

It is an object of the invention to provide a good preparation of the air/fuel mixture for a two-stroke engine having an overflow channel through which the mixture enters. It is also an object of the invention to provide a good preparation of the air/fuel mixture with respect to such an engine even at high rotational speeds.

The two-stroke engine is especially for portable handheld tools such as a chain saw. The engine includes: a cylinder having a top base wall and side wall terminating in the base wall; a piston mounted in the cylinder so as to be movable along the side wall between top dead center and bottom dead center; the cylinder and the piston conjointly defining a combustion chamber wherein heat is generated during the operation of the engine; a crankcase disposed beneath the cylinder; fresh air channel mean for conducting fresh air into the combustion chamber and defining a fresh air port terminating in the side wall at a first distance from the base wall so as to be closed off by the piston while the latter is at least at the top dead center; overflow channel means for conducting an air/fuel mixture into the combustion chamber and defining a mixture port terminating in the side wall at a second distance from the base wall greater than the first distance thereby causing the fresh air port to open before the mixture port during the downward movement of the piston from the top dead center toward the bottom dead center; and, fuel vaporization means including: a vaporization chamber formed in the overflow channel means so as to receive fresh air therein when the mixture port opens and having a first wall in heat conductive proximity to the combustion chamber so as to become heated by the heat in the combustion chamber; and, injection nozzle means for applying fuel to said first wall thereby causing the fuel applied thereto to vaporize and form the air/fuel mixture with the fresh air received in the chamber.

By providing a fuel-vaporization chamber in the overflow channel through which the mixture is delivered, fuel is applied to the hot wall regions by means of a substantially undistributed fuel spray from a simple injection nozzle thereby forming a fuel mixture. This well-prepared mixture remains stored in the overflow channel and is only transported into the combustion chamber by fresh air flowing out from the crankcase when the overflow channel is opened. Since fuel can again be applied to the hot wall regions for vaporization immediately after the mixture is transported and the overflow channel is closed, the time duration from closure to a renewed opening of the mixture overflow channel is available for forming a new mixture for the next combustion operation whereby an exceptional mixture preparation is assured especially with fast-running two-stroke engines which are used for example, in portable handheld tools such as chain saws.

It is to be emphasized that the fuel distribution now occurs essentially through vaporization on the hot wall so that only non-atomizing injection nozzles or injection nozzles which atomize to a limited extent can be used. In an extreme situation, a simple bore in the wall of the vaporization chamber lying opposite the hot wall is adequate as an opening for bringing in the fuel. The selection of the nozzle form as well as the cross section is now independent of the atomization.

No high injection pressure is needed any more even for injection so that simpler injection pumps (pneumatic injection pumps) of lower capacity and therefore lower cost can be used. Also, simpler injection lines can be used because of the reduced injection pressure. Accordingly, injection lines can be used which are stable as to form and yet can be made of flexible plastic having a polyamide base. In this way, a freely selectable arrangement of the pneumatic injection pump is possible.

A further advantage of the apparatus is based upon the condition that the time point of the fuel injection must now no longer be precisely fixed. Conventionally, for two-stroke injection devices, the fuel is injected directly into the combustion chamber as described in U.S. Pat. No. 4,700,668. Injection time points which are too early result in fuel scavenging losses through the cylinder outlet while fuel injection time points which are too late shorten the mixture preparation time. Both conditions lead to a high consumption of fuel and a poor quality of exhaust gas so that the correct time point must be precisely maintained.

The injection time point has a significance which is much less with the above-described fuel injection into the vaporization chamber. Basically, continuous fuel injection could be utilized since the entry of fuel into the cylinder is determined only by the control edge of the mixture overflow channel. With continuous injection, only a portion of the fuel is sprayed onto the wall of the vaporization chamber. During the overflow operation in the mixture overflow channel, injected fuel is immediately entrained by the flow of air and transported into the cylinder. During this overflow operation, the mixture is made intensely turbulent by deflecting the same and when the mixture exits from the channel port thereby providing a well-prepared mixture.

The cylinder and the vaporization chamber advantageously have a common wall which is continually heated without the need for further measures because of the combustion heat and the heat conductivity of the cylinder wall. In order to obtain an optimally heated wall, the vaporization chamber is advantageously located close to the cylinder head base in the region of the cylinder wall where the combustion takes place. The vaporization chamber is connected via a channel with the combustion chamber and this channel is inclined with respect to the end of the cylinder. The channel port is located in the direction toward bottom dead center beyond the fresh air channel port in the cylinder wall.

It is advantageous to configure the vaporization chamber as a recess of an ancillary component part built onto the cylinder. When the ancillary component part is in place, the recess is covered by the cylinder wall and forms the vaporization chamber. The ancillary component part is preferably placed upon the intake support connection on the cylinder and has an intake bore which extends the intake support connection.

The use of flexible hose lines from the vaporization chamber to the crankcase as overflow channel means makes possible a substantially free arrangement of the vaporization chamber on the cylinder itself.

BRIEF DESCRIPTION OF THE DRAWINGS

The invention will now be described with reference to the drawings wherein:

FIG. 3 is a section view of an air-cooled cylinder taken along line B—B of FIG. 4 for the two-stroke engine of FIG. 1; and, FIG. 4 is a section view taken along line C—C through the cylinder of FIG. 3.

DESCRIPTION OF THE PREFERRED EMBODIMENTS OF THE INVENTION

Figure 1:
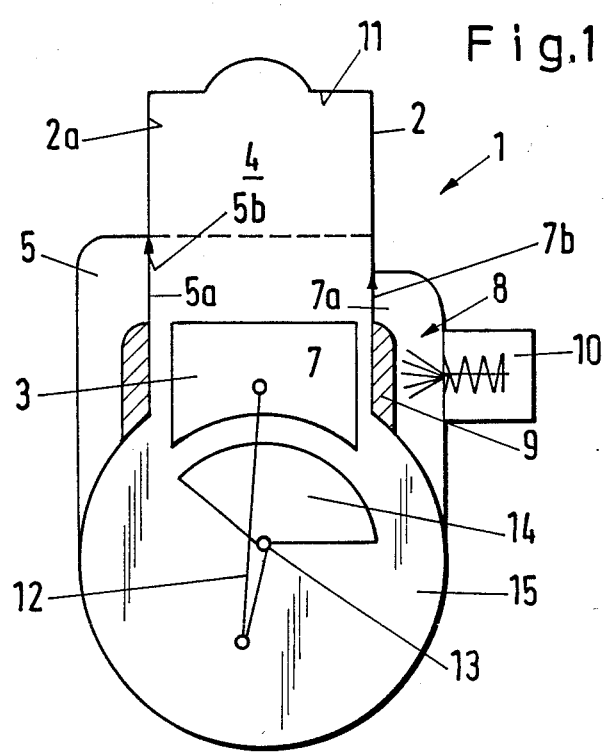
FIG. 1 is a schematic illustration of a two-stroke engine taken along line A—A of FIG. 2.
Figure 2:
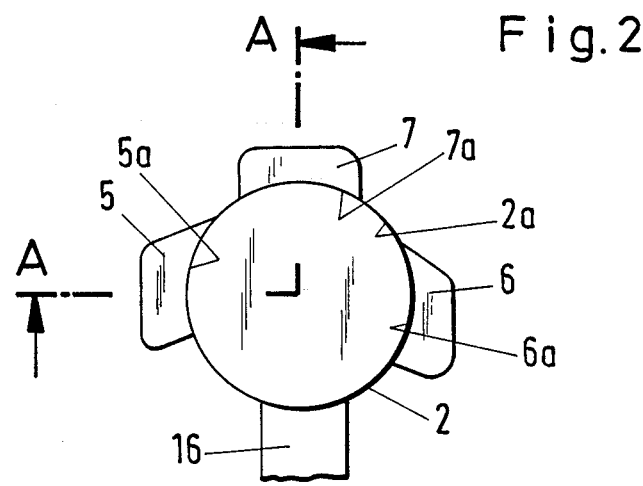
FIG. 2 is a plan view of the cylinder of the two-stroke engine of FIG. 1.

The two-stroke engine 1 shown in FIG. 1 comprises a cylinder 2 in which a piston 3 moves up and down between top dead center and bottom dead center. The cylinder 2 and the piston 3 conjointly define the combustion chamber 4. The cylinder 3 is connected via a connecting rod 12 with a crank shaft 13 mounted in the crankcase 15 and the crank shaft 13 has at least one crank web 14. The combustion chamber 4 of the cylinder 2 is connected via channels 5, 6 and 7 with the crankcase 15 in which the intake channel (not shown) opens.

The channels 5 and 6 are provided strictly a fresh air channels through which fresh air from the crankcase overflows into the combustion chamber 4 with the fresh air being drawn by suction into the crankcase 15 exclusively.

The overflow channel 7 is provided for bringing in a fuel mixture. This mixture overflow channel includes a vaporization chamber 8 which is integrated into the overflow channel 7. The vaporization chamber 8 has a good heat-conducting wall 9 which is common with the cylinder 2. Fuel is injected onto the wall 9 via an injection nozzle 10 disposed in the opposite lying wall.

The ports 5a and 6a of fresh air channels 5 and 6, respectively, lie closer to the cylinder head base 11 than the opening 7a of the mixture overflow channel 7.

At top dead center of piston 3, the piston 3 closes the following: the fresh air channels 5 and 6, the mixture overflow channel 7 and the outlet channel 16. The intake channel opening (not illustrated) to the crankcase is open for this position of the piston and fresh air flows into the crankcase.

Because of the increase in pressure in the combustion chamber 4 after ignition of the mixture compressed therein, the piston 3 travels from its top dead center position in the direction toward its bottom dead center with the outlet channel 16 being opened first for blowing out the combustion gas. With the further downward movement of the piston in the direction toward its bottom dead center position, the piston passes over the upper control edge 5b of the fresh air channel port 5a (FIG. 1), so that, because of the increase in pressure in the crankcase 15 (the air-intake channel is now closed), fresh air can overflow into the combustion chamber 4 via the channels 5 and 6 and scavenge the combustion chamber so that it is free of exhaust gases.

With the further downward movement of the piston 3 and with the fresh air channel ports 5a and 6a already being partially opened, the control edge 7b of the mixture overflow channel port 7a opens and the fresh air flowing through the overflow channel 7 carries in the fuel vaporized by the wall 9. The fresh air which has already flowed in via the fresh air channels 5 and 6 and entered the combustion chamber 4 laterally forms a fresh air barrier ahead of the open outlet channel 16 so that only very small portions of the fuel mixture transported in are lost through the outlet channel. The mixture overflow channel lies opposite the outlet channel 16.

After passing through bottom dead center, the following are closed sequentially: the mixture overflow channel port 7a, the fresh air channel ports 6a and 5a as well as the outlet channel 16; and, the intake channel opening is opened to allow fresh air to flow into the crankcase 15. After compressing the mixture up to the top dead center of the piston 3, this mixture is again ignited and the described cycle begins anew.

By means of the injection of fuel into a vaporization chamber 8 of the overflow channel 7, this injection can take place substantially independently of the position of the piston 3 and especially far in advance of the opening of the port of the mixture overflow channel. The mixture preparation is now satisfactory even for fast-running two-stroke engines such as those utilized in motor chain saws.

The injection of fuel for a cycle can already take place during the compression cycle of the previous cycle after closure of the mixture overflow channel port 7a. The fuel applied to the hot wall 9 vaporizes off and forms a well prepared air/fuel mixture. The vaporization is possible until the renewed opening of the port 7a for admitting the air/fuel mixture so that a very long time duration for preparing the mixture is available.

Because of the long time duration which is available, it is advantageous that the fuel only has to be slightly or not at all atomized by means of the injection nozzle for the vaporization, so that simple nozzles can be used and, in the extreme situation, a simple injection hole in the wall of the vaporization chamber would be adequate. An injection pump for supplying the injection nozzle 10 with fuel must likewise only provide a low injection pressure so that simple pumps can be utilized. It is emphasized that the injection line from the injection pump (not shown) to the injection nozzle 10 need no longer have a rigid configuration; instead, injection lines made of form-stable but soft plastic can be utilized with the plastic preferably having a polyamide base. In this way, the rigid attachment of the injection pump to the two-stroke engine is not necessary because of the rigid injection lines which would otherwise be needed.

FIGS. 3 and 4 show a one-piece cylinder 2 having cooling ribs for air cooling the engine. The mixture overflow channel 7 is formed by means of two hose conduits 27 opening into the vaporization chamber 8. The conduits 27 are connected with the crankcase 15. The vaporization chamber 8 itself is essentially provided by a recess 28 in an ancillary component 23 which is attached on the cylinder and is placed on the intake support connection 24 on the cylinder 2. The recess 28 is bounded by the cylinder wall region 9 and the connection 24 so as to define a closed vaporization chamber 8 which is connected via a bore 29 which connects the port 7a with the combustion chamber 4 with the port 7a being formed in the cylinder wall 2a.

A bore 21 lying opposite in the ancillary component part 23 of the wall is provided for receiving the injection nozzle 10 which has an opening lying opposite to the wall 9. The injection jet axis is preferably inclined with respect to wall 9.

After being paced over the connection 24, the ancillary component part 23 is attached to the cylinder 2 via screws projecting beyond the bore 25. In the ancillary component part 23, a through bore for forming the intake channel 22 is provided coaxially to the intake support connection 24. The intake pipe is connected to the intake channel 22.

A receiving bore 20 for the spark plug is provided in the head of the cylinder.

The fresh air channels 5 and 6 integrated into the cylinder 2 can be seen in FIG. 3. When viewed in the stroke direction of the piston toward top dead center, each channel opens above the port 7a of the mixture overflow channel 7 in the cylinder wall 2a. The opening 5c shown in FIG. 4 is the inlet port from the crankcase 15 to the fresh air channels 5 and 6. This opening 5c can be open at the bottom dead center position of the piston which is the opposite condition for the inlet channel port 22a of the intake channel which is then closed.

Unsymmetrical control times of the channels are possible by utilizing control sliders. In the embodiments described, the channels are opened symmetrically to bottom dead center or top dead center over the crank shaft angle.

It is understood that the foregoing description is that of the preferred embodiments of the invention and that various changes and modifications may be made thereto without departing from the spirit and scope of the invention as defined in the appended claims.

What is claimed is:

1. A two-stroke engine, especially for portable hand-held tools such as a chain saw, the engine comprising:
   a cylinder having a top base wall and side wall terminating in said base wall;
   a piston mounted in said cylinder so as to be movable along said side wall between top dead center and bottom dead center;
   said cylinder and said piston conjointly defining a combustion chamber wherein heat is generated during the operation of the engine;
   a crankcase disposed beneath said cylinder;
   fresh air channel means for conducting fresh air into said combustion chamber and defining a fresh air port terminating in said side wall at a first distance from said base wall so as to be closed off by said piston while the latter is at least at said top dead center;
   overflow channel means for conducting an air/fuel mixture into said combustion chamber and defining a mixture port terminating in said side wall at a second distance from said top base wall greater than said first distance thereby causing said fresh air port to open before said mixture port during the downward movement of said piston from said top dead center toward said bottom dead center;
   a vaporization chamber formed in said overflow channel means so as to receive fresh air therein when said mixture port opens and having a first wall defined by said side wall of said cylinder so as to be common to both said combustion chamber and said vaporization chamber thereby becoming heated by said heat;
   said vaporization chamber being disposed adjacent to said top base wall of said cylinder and having a second wall disposed opposite said first wall; and,
   injection nozzle means mounted in said second wall for applying fuel to said first wall thereby causing the fuel applied thereto to vaporize and form said air/fuel mixture with the fresh air received in said chamber.

2. The two-stroke engine of claim 1, said injection nozzle means being an injection nozzle mounted in said second wall so as to direct the fuel toward said first wall in a direction inclined with respect to the latter.

3. The two-stroke engine of claim 1, comprising air intake channel means for conducting air directly into said combustion chamber; said vaporization chamber being disposed above said air intake channel means; and, said overflow channel means including a connecting channel extending downwardly toward said crankcase and connecting said vaporization chamber to said combustion chamber.

4. The two-stroke engine of claim 3, comprising an ancillary component part mounted on said cylinder; and, said vaporization chamber being formed as a recess in said component part.

5. The two-stroke engine of claim 4, said air intake channel means including an air intake support connection formed on said cylinder and defining a first air intake channel segment opening into said combustion chamber; and, said component part being seated on said support connection and defining a second air intake channel segment communicating with said first air intake channel.

6. The two-stroke engine of claim 1, said fuel vaporization means including at least one hose line connecting said vaporization chamber to said crankcase.

* * * * *

UNITED STATES PATENT AND TRADEMARK OFFICE
CERTIFICATE OF CORRECTION

PATENT NO. : 4,876,999
DATED : October 31, 1989
INVENTOR(S) : Roland Schierling and Werner Geyer It is certified that error appears in the above-identified patent and that said Letters Patent is hereby corrected as shown below:

In column 1, line 49: delete "mean" and substitute -- means -- therefor.

In column 3, line 51: delete "a" and substitute -- as -- therefor.

In column 5, line 24: delete "paced" and substitute -- placed -- therefor.

Signed and Sealed this

Twenty-fifth Day of September, 1990

Attest:

HARRY F. MANBECK, JR.

Attesting Officer

Commissioner of Patents and Trademarks